US011005893B2

(12) United States Patent
Salman et al.

(10) Patent No.: US 11,005,893 B2
(45) Date of Patent: May 11, 2021

(54) AUTOMATIC GENERATION OF SECURITY RULES FOR NETWORK MICRO AND NANO SEGMENTATION

(71) Applicant: Microsoft Technology Licensing, LLC, Redmond, WA (US)

(72) Inventors: Tamer Salman, Haifa (IL); Ben Kliger, Ramat-Gan (IL); Bolous AbuJaber, Nazareth (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 195 days.

(21) Appl. No.: 16/209,280

(22) Filed: Dec. 4, 2018

(65) Prior Publication Data
US 2020/0177638 A1    Jun. 4, 2020

(51) Int. Cl.
*H04L 29/06* (2006.01)
*H04L 12/24* (2006.01)
*H04L 12/26* (2006.01)

(52) U.S. Cl.
CPC ............ *H04L 63/205* (2013.01); *H04L 41/12* (2013.01); *H04L 41/142* (2013.01); *H04L 41/22* (2013.01); *H04L 43/16* (2013.01); *H04L 43/50* (2013.01); *H04L 63/0263* (2013.01)

(58) Field of Classification Search
CPC ... H04L 63/205; H04L 63/0263; H04L 63/14; H04L 41/12; H04L 41/142; H04L 41/22; H04L 41/0893; H04L 41/0813; H04L 41/046; H04L 43/16; H04L 43/50; H04L 43/0876
See application file for complete search history.

(56) References Cited

U.S. PATENT DOCUMENTS

| 2008/0240128 | A1 | 10/2008 | Elrod | |
| 2016/0359915 | A1* | 12/2016 | Gupta | H04L 63/20 |
| 2018/0176252 | A1* | 6/2018 | Nimmagadda | H04L 41/0893 |
| 2019/0281466 | A1* | 9/2019 | Zhang | H04L 41/0896 |

OTHER PUBLICATIONS

"International Search Report and Written Opinion Issued in PCT Application No. PCT/US2019/063473", dated Jan. 30, 2020, 10 Pages.

(Continued)

*Primary Examiner* — Nelson S. Giddins
(74) *Attorney, Agent, or Firm* — Fiala & Weaver P.L.L.C.

(57) ABSTRACT

Methods, systems, apparatuses, and computer program products are provided for generating a network security rule. Existing security rules may be determined across a network that includes a plurality of network resources, such as computing devices or virtual machines. A map is generated that identifies each of the permitted connections between the resources over the network. In some implementations, the map may include a network topology map. Network traffic data for each of the permitted connections may be gathered or monitored. Based on the existing security rules and the gathered network traffic data, an enhanced security rule may be generated for a particular connection that reduces data traffic over connection, which improves network security by further hardening the available communication paths.

20 Claims, 6 Drawing Sheets

(56) References Cited

OTHER PUBLICATIONS

"Discovery and Deployment", Retrieved From: https://www.tufin.com/features/discovery-and-deployment, Retrieved On: Dec. 10, 2018, 3 Pages.

"Solutions: Nano-Segmantation", Retrieved From: https://www.illumio.com/solutions-nano-segmentation, Retrieved on: Dec. 10, 2018, 4 Pages.

Friedman, John, "The Definitive Guide to Micro-Segmentation", Retrieved From: https://cdn2.hubspot.net/hubfs/407749/Downloads/Illumio_eBook_The_Definitive_Guide_to_Micro_Segmentation_2017_08.pdf, Jan. 31, 2018, 80 Pages.

Jerbi, Amir, "Network Nano-Segmentation for Container Security in Aqua 2.0", Retrieved From: https://blog.aquasec.com/network-nano-segmentation-for-container-security-in-aqua-2.0, Feb. 2, 2017, 6 Pages.

Nelson, Eric, "Network Segmentation", Retrieved From: https://www.forescout.com/company/blog/network-segmentation/, Jun. 7, 2017, 7 Pages.

\* cited by examiner

400

402 Determine that the network traffic data indicates data traffic over the permitted connection does not exceed a threshold of volume or frequency of data traffic

404 Generate the enhanced security rule in response to the determination

502 Identify a process that initiates data traffic over a particular connection

504 Generate an enhanced security rule for the particular connection that allows the identified process and denies data transmissions for other processes

FIG. 5

AUTOMATIC GENERATION OF SECURITY RULES FOR NETWORK MICRO AND NANO SEGMENTATION

BACKGROUND

Network security is an integral aspect in the protection of computers and sensitive content of an organization. For instance, where an organization relies on cloud-based applications or platforms, cloud providers may enable users to restrict access to network resources based on one or more user-defined access rules. Such rules may be implemented in a network firewall or by identifying security groups. In typical environments, a user must analyze the network and generate access rules manually. For example, an engineer responsible for a company's network security may need to identify which restrictions should be put in place and write specific rules for each access restriction. In other situations, the engineer may group or isolate network resources and specify the allowed communication paths between resources.

In each solution, however, the engineer must manually define the rules, either textually or through a graphical interface. As the number of resources increases on a given network, such as into the hundreds, thousands, or greater numbers, the less scalable these solutions become. Furthermore, existing techniques are cumbersome, tedious, and time-consuming, often requiring several engineers (or teams of engineers) to manage the network security for an organization. In addition, existing techniques are prone to errors, leaving open unintended communication paths that result in security vulnerabilities that may be exploited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for generating an enhanced network security rule. Existing security rules may be determined across a network that includes a plurality of network resources, such as computing devices and virtual machines. A map is generated that identifies each of the permitted connections between the resources over the network. In some implementations, the map may include a network topology map. Network traffic data for each of the permitted connections may be monitored or gathered. Based on the existing security rules and the gathered network traffic data, an enhanced security rule may be generated for a particular connection that reduces data traffic over connection.

In accordance with implementations described herein, communication paths that are open based on existing security rules may be restricted if network traffic is not observed over the communication path over a monitoring period. In this manner, generation of security rules for implementation on a network that takes into account an existing network landscape as well as actual network usage may be automated to enhance the overall network security of an organization.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows flowchart of a method for generating an enhanced security rule based on a determining that network traffic data does not exceed a threshold, according to an example embodiment.

FIG. 5 shows a flowchart of a method for generating an enhanced security rule that identifies a process that initiated data traffic, according to an example embodiment.

Figure 1:
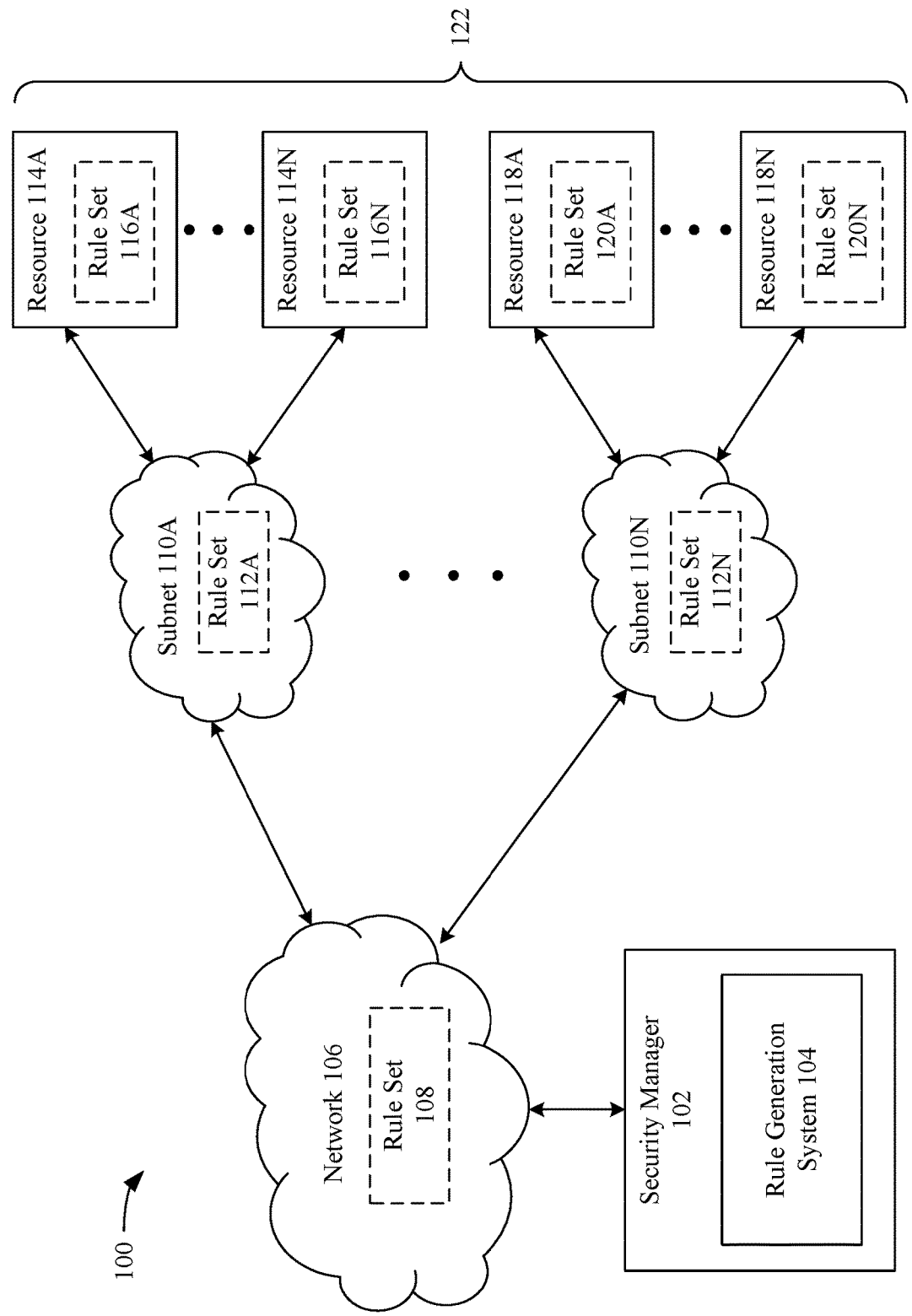
FIG. 1 shows a block diagram of an automated rule generator system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Network security is an integral aspect in the protection of computers and sensitive content of an organization. For instance, where an organization relies on cloud-based applications or platforms, cloud providers may enable users to restrict access to network resources based on one or more user-defined access rules. Such rules may be implemented in a network firewall or by identifying security groups. In typical environments, a user must analyze the network and generate access rules manually. For example, an engineer responsible for a company's network security may need to identify which restrictions should be put in place and write specific rules for each access restriction. In other situations, the engineer may group or isolate network resources and specify the allowed communication paths between resources.

In each solution, however, the engineer must manually define the rules, either textually or through a graphical interface. An organization may have thousands of servers and thousands of user computers (e.g., desktops and laptops) connected to their network. The servers may each be a certain type of server such as a load balancing server, a firewall server, a database server, an authentication server, a personnel management server, a web server, a file system server, and so on. In addition, the user computers may each be a certain type such as a management computer, a technical support computer, a developer computer, a secretarial computer, and so on. Each server and user computer may have various applications installed that are needed to support the function of the computer. As a result, thousands of devices of different types operating thousands of applications may be interconnected by tens of thousands of connections. The many thousands of devices, applications, and connections, and existing security settings on the various network resources make it impossible for human network analyzers to configure network security for a given network. Even relatively small numbers of devices lead to many numbers of applications, existing security settings, and possible connections between the devices, again making it impractical for human network analyzers to configure network security.

Thus, as the number of connected resources increases on a given network, the less scalable the above-mentioned solutions become. Furthermore, existing techniques are cumbersome, tedious, and time-consuming, often requiring several engineers (or teams of engineers) to manage the network security for an organization. In addition, existing techniques are prone to errors, leaving open unintended communication paths that result in security vulnerabilities and potential breaches on a cloud-computing network that may be exploited.

Embodiments described herein address these and other issues by providing a system for automatically generating a security rule for implementation on a network. In the system, the allowed connections between various resources coupled to the network may be determined by analyzing the existing security rules across the network (e.g., on the network as a whole, a subnetwork, and/or on individual resources). Based on the existing security rules, a topology map may be generated that identifies the permitted connections between the resources included in the network. A network traffic data collector may monitor actual network traffic over the permitted connections. Using the existing security rules and the monitored traffic, an enhanced security rule may be generated that that is configured to reduce data traffic over at least one of the permitted connections.

Generating an enhanced security rule in this manner has numerous advantages. For instance, because the enhanced rule may be configured to provide a restriction on one or more permitted connections, such as a communication path that is available for data transmissions but is not used (or rarely used) based on monitoring actual data traffic, the resource security may be improved. For example, such a generated rule may reduce the risk of an intruder (located internal to the network or located externally) maliciously obtaining access to any of the resources, compromising sensitive data, installing malicious software, or otherwise exploiting vulnerabilities on any of the network's resources. This is because intruders frequently use connections/communication paths that are less frequented by normal network operations. Thus, placing restrictions on lesser used connections/communication paths can impair intruder activity. Furthermore, by improving network security in such a manner, the network as whole may also be protected from other types of attacks, such as unintended or unnecessary data transmissions, phishing attacks, or any other type of network attack from internal and/or external sources. As a result, security and operation of the computers on the network, as well as the network itself, may be improved.

Example implementations are described as follows that are directed to a system for generating an enhanced security rule. For instance, FIG. 1 shows a block diagram of an example computing system 100, according to an example embodiment. As shown in FIG. 1, system 100 includes a security manager 102, resources 114A-114N, and resources 118A-118N, which may be communicatively coupled by one or more networks or subnetworks (subnets). For instance, any of the resources shown in FIG. 1 may be communicatively coupled to one or more other resources via network 106 and/or subnets 110A-110N. Network resources 122 comprise the resource set of system 100, including but not limited to resources 114A-114N, 18A-118N, and any other resources not shown in FIG. 1 coupled to any one or more of network 106 and/or subnets 110A-112N. Security manager 102 includes a rule generation system 104. As described in greater detail below, rule generation system 104 may be configured to generate one or more enhanced security rules associated with network 106, subnets 110A-110N, or network resources 122 coupled thereto. System 100 is further described as follows.

Network 106 and subnets 110A-110N may each include one or more of any of a local area network (LAN), a wide area network (WAN), a personal area network (PAN), a combination of communication networks, such as the Internet, and/or a virtual network. Security manager 102 may be communicatively coupled to any one of network resources 122 via network 106 and/or subnets 110A-110N. In an implementation, security manager 102, network 106, subnets 110A-110N, and any one of network resources 122 may communicate via one or more application programming interfaces (API), and/or according to other interfaces and/or techniques.

Security manager 102, network 106, subnets 110A-110N, and network resources 122 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Network resources 122 may comprise any node, device or machine (physical or virtual) coupled to any of network 106 or subnets 110A-110N. In one example embodiment, network 106 and/or subnets 110A-110N may collectively comprise a network of an organization (including but not limited to a company, business, or cloud-based subscription), and network resources 122 may include any node, device, or machine coupled to the network. In some further example embodiments, network 106 and/or subnets 110A-110N may comprise a virtual or cloud-based network, and network resources 122 may comprise one or more virtual machines or nodes of the virtual or cloud-based network. In some other examples, any of network resources 122 may comprise a desktop computer, a portable computer, a smartphone, a tablet, a wearable computing device (e.g., a smart watch, a smart headset), a mixed and/or virtual reality device (e.g., Microsoft HoloLens™), or any other processing device. Network resources 122 are not limited to processing devices in implementations, and may include other resources on a network, such as storage devices (e.g., physical storage devices, local storage devices, cloud-based storages, hard disk drives, solid state drives, random access memory (RAM) devices, etc.), databases, etc.

It is noted and understood that implementations are not limited to the illustrative arrangement shown in FIG. 1. Rather, an organization may comprise any number of networks, virtual networks, subnets, machines or virtual machines (or other resources) coupled in any manner. For instance, a subnet can comprise one or more additional subnets (not shown), resources can be coupled to a plurality of subnets or coupled to network 106 without a subnet, etc. Furthermore, network resources 122 and security manager 102 may be co-located, may be implemented on a single computing device or virtual machine, or may be implemented on or distributed across one or more additional computing devices or virtual machines not expressly illustrated in FIG. 1.

In some other example embodiments, security manager 102 may be implemented on one or more servers. For instance, such servers may be part of a particular organization or company associated with network 106 and/or subnets 110A-110N, or may be a cloud-based server configured to provide services for a plurality of organizations. Furthermore, although FIG. 1 depicts a single security manager 102, it is understood that implementations may comprise any number of security managers.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Each of network 106, subnets 110A-110N, resources 114A-114N, and resources 118A-118N may comprise a rule set. For example, network 106 may comprise a rule set 108, subnets 110A-110N may respectively comprise rule sets 112A-112N, resources 114A-114N may respectively comprise rule sets 116A-116N, and resources 118A-118N may respectively comprise rule sets 120A-120N. Each rule set may include one or more security rules, including access rules, that are each associated with the network, one or more subnets, and/or one or more resources. Collectively, security rules provided in rule sets 108, 112A-112N, 116A-116N, and 118A-118N may control communications between resources across network 106 by allowing, denying, or throttling network traffic between resources. In some examples, network 106 and/or one or more subnets 110A-110N may comprise one or more hardware devices (e.g., a router, a switch, etc.) may store rule sets associated with the network or subnet (or resources coupled thereto). In some other examples, network 106 and/or one or more subnets 110A-110N may store associated rule sets in one or more locations remote from the network or subnet, such as a cloud-based storage or server (e.g., in a central location or the like). It is noted and understood that such implementations are not intended to be limiting, and rule sets may be stored in any other manner appreciated by those skilled in the relevant art.

In embodiments, a security rule may be configured according to any suitable format. In one example, a security rule may include one or more of the following attributes/settings:

Source—an address for a source resource, such as a network security group, an IP address, a service tag, etc. for an inbound or outbound security rule.

Source port ranges—an identification of one or more source ports that identifies which port(s) that traffic is allowed or denied by the security rule.

Destination—an address for a destination resource, such as a security group, an IP address, a service tag, etc. for an inbound or outbound security rule.

Destination port ranges—an identification of one or more destination ports that identifies which port(s) that traffic is allowed or denied by the security rule.

Protocol—indicates a communication protocol that the security rule allows or denies.

Action—indicates the allow or deny action.

Priority—indicates a priority value for the security rules (where security rules are processed in priority order).

Name—a unique name for a security rule.

Description—a description of the security rule.

In other embodiments, a security rule may include additional and/or alternative types of attributes/settings.

As described below in greater detail, rule generation system 104 may be configured to generate one or more enhanced security rules for network 106 (which may include one or more subnets as shown in FIG. 1). Rule generation system 104 may be configured to determine existing security rules across network 106 (e.g., from rule sets shown in FIG. 1), generate a map of permitted connections based on the existing rules and monitor actual data traffic over such permitted connections. Based on the existing rules and the monitored traffic, rule generation system 104 may generate an enhanced security rule for one or more of the permitted connections.

In some example embodiments, rule generation system 104 may automatically suggest such enhanced security rules to harden a network in a micro-segmentation manner where network resources may be divided into logical groups and restrictive access rules may be implemented in an ordered or prioritized way to restrict potentially malicious activities on a network. For instance, enhanced security rules in a micro-segmented network may include restrictions on network traffic based on a configuration of the applicable security rule settings (e.g., as shown above), including settings of a source or destination Internet Protocol (IP) address associated with the traffic, ports through which transmissions may be allowed or denied, and/or protocols through which transmissions may be allowed or denied. In some other examples, such as where a nano-segmented network is implemented, the enhanced security rules may also include further network restrictions based on the process that initiates the network traffic (e.g., the software or application that initiates a data transfer).

In implementations, rule generation system 104 may be configured to automate network micro-segmentation and nano-segmentation by generating appropriate security rules based on current network topology and monitored network traffic that augment existing security rules. Such rules may be deployed or implemented in at various locations or levels across network 106, including but not limited to the network level, subnet level, resource level, or any other grouping of network resources. For instance, as illustrated in FIG. 1, enhanced security rules may be optimally applied to any of rule sets 108, 112A-112N, 116A-116N, and/or 118A-118N. By augmenting existing rules in this manner, greater security protections may be placed across network 106 to restrict communication paths that are open but unused, thereby reducing the likelihood that an attacker (e.g., an employee or former employee of an organization, a visitor, or anyone else that may have gained access to a network) accesses sensitive information or otherwise breaches network resources.

Figure 2:
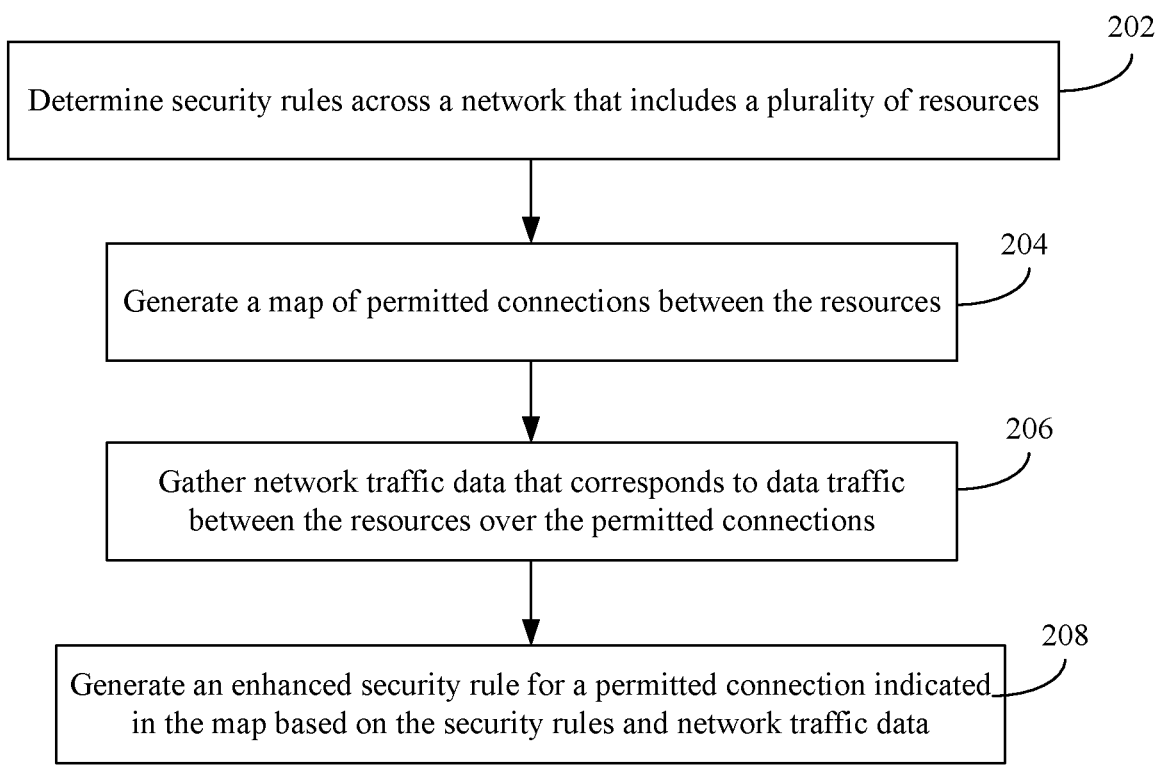
FIG. 2 shows a flowchart of a method for generating an enhanced network security rule, according to an example embodiment.
Figure 3:
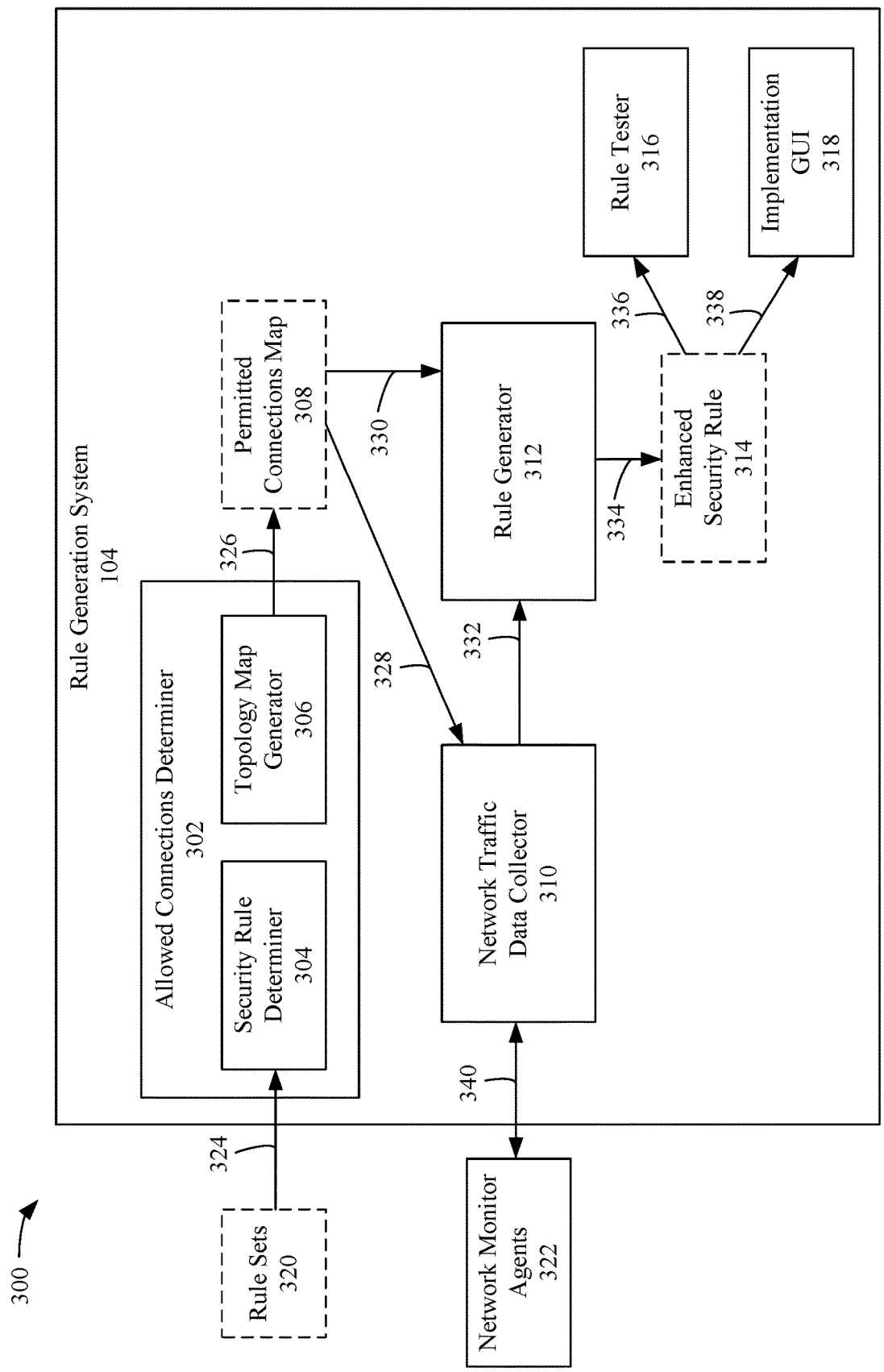
FIG. 3 shows a block diagram of a system for generating a security rule, according to an example embodiment.

Rule generation system 104 may operate in various ways to generate an enhanced security rule for a network. For instance, rule generation system 104 may operate according to FIG. 2. FIG. 2 shows a flowchart 200 of a method for generating an enhanced network security rule, according to an example embodiment. For illustrative purposes, flowchart 200 and rule generation system 104 are described as follows with respect to FIG. 3. FIG. 3 shows a block diagram of a system 300 for generating a security rule, according to an example embodiment. As shown in FIG. 3, system 300 includes rule generation system 104 and one or more network monitor agents 322. Furthermore, rule generation system 104 includes an allowed connections determiner 302, a network traffic data collector 310, a rule generator 312, a rule tester 316, and an implementation graphical user interface (GUI) 318. As shown in FIG. 3, allowed connections determiner includes a security rule determiner 304 and a topology map generator 306 that may obtain one or more rule sets 320 and generate a permitted connections map 308. Network traffic data collector 310 may communicate with network monitor agents 322 to monitor traffic across network 106. As shown in FIG. 3, rule generator 312 may generate an enhanced security rule 314 that may be implemented on network 106, subnets 110A-110N, or any of the resources coupled thereto. Flowchart 200 and system 300 are described in further detail as follows.

Flowchart 200 of FIG. 2 begins with step 202. Security rules are determined across a network that includes a plurality of resources. For instance, with reference to FIGS. 1 and 3, security rule determiner 304 may be configured to determine security rules across network 106, which may comprise one more subnets 110A-110N and a plurality of network resources 122. Security rule determiner 304 may determine security rules by obtaining 324 rule sets 320. In implementations, rule sets 320 may comprise each set of security rules across network 106. For instance, with reference to the illustrative arrangement of FIG. 1, rule sets 320 may include each of rule set 108, rule set 112A-112N, rule sets 116A-116N, and rule sets 120A-120N. Rule sets 320 may include, but are not limited to, security rules in rule sets that are inputted manually (e.g., through textual or graphical user interface) or automatically through any other manner that allows or denies data transmissions over particular communication paths.

In some examples, a rule set may be implemented on a firewall or a security group that indicates which data traffic should be allowed and/or denied. For example, a rule set in a firewall or security group may identify one or more source or destination IP addresses associated with network 106 that may or may not transmit and/or receive data transmissions, particular ports through which transmissions may be allowed or denied, or particular protocols through which transmissions may be allowed or denied. As shown in FIG. 1, such rules may be implemented in rule sets at various locations in an organization, including at a network level (e.g., network 106), at a subnet level (e.g., any one of subnets 110A-110N), and/or at particular resource (e.g., network resources 122).

For example, each endpoint or node in network 106 may comprise a security rule set, as shown in FIG. 1. Where the endpoint or node (e.g., one of network resources 122) is a virtual machine and network 106 comprises a virtual network, a network interface of the virtual machine may comprise a rule set that identifies security rules for the network interface. It is noted and understood, however, that a virtual machine may comprise a plurality of network interfaces in some examples, and each network interface may comprise its own rule set. For instance, a single virtual machine may comprise a plurality of network interfaces corresponding to different subnets of network 106, and each network interface may comprise security rules (e.g. in a firewall or one or more security groups) that control communications between the virtual machine over the particular subnet.

In one illustrative example, rule set 112A may indicate that data transmissions originating from a particular IP address are allowed for resources 116A-116N, w ile blocking all other data transmissions for resources 116A-116N. In another illustrative example, a network interface of resource 118A may comprise a security rule (e.g., in a firewall or the like) indicating that communications with other network resources over certain ports or protocols are permitted, while denying communications over different protocols or ports. In some further examples, rule sets may be implemented at a plurality of different levels (e.g., at a subnet level and/or at one or more network resources). As a result, for a particular endpoint or node (e.g., one of network resources 122), such as a virtual machine, data transmissions to or from the resource may be controlled by the combination of the security rules of the resource, and any subnets or networks which the resource is a part.

Accordingly, data transmissions on network 106 may be allowed or denied based on the combination of one or more security rules in various rule sets on network 106. In implementations therefore, security rule determiner 304 may determine security rules across network 106 by obtaining the set (or sets) of security rules existing with respect to the entire network, including any subnets and/or network resources.

In step 204, a map of permitted connections between the resources is generated. For instance, with reference to FIG. 3, topology map generator 306 may generate 326 a permitted connections map 306 that identifies the permitted connections between network resources 122 over network 106. Topology map generator 306 may generate permitted connections map 308 in a variety of ways. In one non-limiting example, topology map generator 306 may be configured to generate a network topology that comprises a hierarchical tree representing the network. For instance, the topology may comprise a network (or a plurality of networks) that includes a hierarchy of a plurality of subnets, where each subnet comprises a plurality of resources (e.g., network interfaces or virtual machines) associated with the particular subnet. Based on the network topology and the existing security rules, topology map generator 306 may identify each allowed communication path between all of the resources in network 106 (e.g., each communication path in which one resource can directly or indirectly communicate with another resource).

In some implementations, topology map generator 306 may comprise an algorithm or other process for identifying each such communication path between pairs of resources to generate permitted connections map 308. For instance, topology map generator 306 may extract each security rule across network 106 (including each security rule on any subnets and resources included within a hierarchy of network 106) and intersect each obtained rule to generate permitted connections map 308. In other words, by combining security rules across network 106 at various hierarchy levels, topology map generator 308 may be configured to generate an aggregated map that identifies all of the allowed communication paths.

Permitted connections map 308 may comprise a topology map or the like that textually and/or graphically illustrates the topology of network 106 and each allowed communication between resources. For instance, allowed communication paths may be depicted on a topology map in a superimposed manner, via one or more annotations, or in any other suitable manner. Permitted connections map 308 is not limited to a topology map, but may comprise any other graphical or non-graphical representation of permitted connections between resources in network 106 based on existing security rules. For instance, permitted connections map 308 may comprise a textual representation, a chart, a graph, a table, or any combination thereof for identifying permitted connections between resources. Permitted connections map 308 may comprise a single map for network 106 or may comprise multiple maps in some implementations, such as separate maps for each subnet or resource, or any other logical arrangement as will be appreciated by those skilled in the relevant arts.

Accordingly, topology map generator 306 may be configured to traverse all paths between pairs of resources based on existing security rules in a network configuration to generate a map of permitted connections. In implementations, the map of permitted connections may comprise one or more details associated with each permitted connection, such as an IP address of a source/transmitting resource, an IP address of a destination/receiving resource, source and/or destination ports through which the connection is permitted, and a protocol through which the connection is permitted. In a further implementation, permitted connections map 308 may include an identification of a process, such as an identifier of the software or executable file that is permitted to transmit data between pairs of resources. Any number of attributes and/or types of attributes describing each connection may be include included in the topology map of permitted connections map 308.

As a result, in example embodiments, each allowed connection or communication path may be identified by a tuple of values and/or identifiers (e.g., a source IP, destination IP, source port, destination port, protocol, and/or process). In one non-limiting illustration, an algorithm implemented to identify allowed connections in a micro-segmented network environment may comprise an algorithm as follows:

```
T = Tree(Network), S = SecurityRules(Network)
def ComputeAllowedConnections (T, S):
    forpairwise (u, v) in T:
        AllowedConnections [u, v] = ApplyRules (u, v, S)
    returnAllowedConnections
def ApplyRules (u, v, S):
    AllowedPorts = [ ]
    forrule in S:
        if u inrule[sources] and v inrule [destinations]:
            ifrule[access] == Allow:
                AllowedPorts += rule[ports]
            else:
                AllowedPorts -= rule[ports]
    returnAllowedPorts
```

Note that permitted connections map 308 may be stored and be transportable in any form, including a file, a table, an array, a database, or other data structure.

In step 206, network traffic data that corresponds to data traffic between the resources over the permitted connections is gathered. For instance, with reference to FIG. 3, network traffic data collector 310 may be configured to obtain 328 permitted connections map 308 and gather network traffic data on network 106 between pairs of resources 122 over each of the permitted connections. Network traffic data that is gathered may include collecting actual network traffic data across each permitted connection over monitoring period or other time period. In example embodiments, network traffic data may be gathered and stored in a granular fashion based on the actual traffic itself. For instance, network traffic data may be gathered and stored for each source IP, destination IP, source port, destination port, protocol, an initiating process, a time, etc. for each monitored transmission. Network traffic data may be stored in any suitable manner, including but not limited to a map (e.g., a topology map or as an overlay to permitted connections map 308), chart, graph, or any other representation identifying monitored network traffic across a plurality of permitted network connections.

In some implementations, network traffic data controller 310 may be configured to deploy 340 one or more network monitor agents 322 at various locations across network 106 to record network data traffic over each of the permitted connections (e.g., in traffic log files). Network monitor agents 322 may comprise software or instructions configured to execute on network 106 or subnets 110A-110N (e.g., on a router, switch, firewall, etc.), on any one or more of network resources 122, or any one or more nodes on network 106. In another example, network monitor agents 322 may comprise a host service that may execute on one or more resources (e.g., network resources 122) to record incoming and outgoing network traffic. Network monitor agents 322 may monitor network traffic over one or more allowed communication paths over a time period and report such monitored network traffic to network traffic data collector 310 in an aggregated form, or may report monitored traffic in an aggregated form for aggregation by network traffic data collector 310. In yet another implementation, network traffic data controller 310 may be configured to obtain and/or record network traffic directly from one or more devices on network 106 (e.g., routers, firewalls, switches, etc.). Implementations are not limited to these illustrative examples, and any other suitable technique for monitoring actual network traffic between resources may be utilized.

Network traffic data controller 310 may monitor network data traffic in terms volume (e.g., the actual amount of incoming/outgoing data, such as in bytes, kilobytes, megabytes, etc.) and/or frequency (how often data is transmitted over each communication path). As described above, network traffic data controller 310 may monitor network data traffic over a time period. For instance, the time period may comprise any period of time that is representative of ordinary network usage, such as one day, one week, one month, etc., or any other predetermined time period.

In step 208, an enhanced security rule is generated for a permitted connection indicated in the map based on the security rules and the network traffic data. For instance, with reference to FIG. 3, rule generator 312 may be configured to generate 334 enhanced security rule 314 based on existing security rules across network 106 and network traffic data gathered by network traffic data collector 310. In implementations, enhanced security rule 314 may comprise a rule that is configured to reduce data traffic over at least one of the permitted connections. For instance, enhanced security rule 314 may comprise a security rule that may increase network security by restricting or preventing communications over communication paths that are permitted but not utilized based on monitored network traffic. By generating enhanced security rule 314 that restricts open, but unused communication paths, rule generator 312 may thereby further harden network 106 while also taking into account existing security rules.

Enhanced security rule 314 may comprise any number of security rules that may be recommended and/or enforced at any suitable location across network 106, including but not limited to firewalls, routers, switches, security groups, etc. In some examples, enhanced security rule 314 may be implemented in any one or more of rule set 108, rule set 112A-112N, rule sets 116A-116N, rule sets 120A-120N, or any other location or combination thereof.

Rule generator 312 may generate enhanced security rule 314 in a variety of ways. In one example, rule generator 312 may obtain 330 permitted connections map 308 and obtain 332 monitored network traffic data. Rule generator 312 may compare the differences between permitted connections map 308 and monitored network traffic data to identify the permitted connections across network 106 that are not utilized during an actual traffic monitoring period. In a further example, such as where monitored network traffic data and permitted connections map 308 each comprise a map or the like, rule generator 312 may be configured to identify the unused but open connections by subtracting the map, graph, chart, etc. representing the monitored network traffic data from the map, graph, chart, etc. representing permitted connections map 308. In some implementations, rule generator 312 may also generate a map, graph, chart, etc., or any other representation, identifying the open but unused communication paths across network 106. It is noted and understood, however, that any other technique known and appreciated to those skilled in the relevant art may be implemented to determine the identities of each communication path across network 106 that is open based on existing security rules but not utilized.

In this manner, rule generator 312 may automatically determine network vulnerabilities that may exist across network 106 due to communication paths that existing security rules have been left open, but that are not actually used. By identifying such communication paths, rule generator 312 may generate enhanced security rule 314 that restricts traffic over such communication paths. For example, where a communication path is open based on existing security rules but not utilized for a period of time (e.g., during a monitoring period), enhanced security rule 314 may generate a security rule that is configured to deny or block traffic along the identified communication path. As discussed above, enhanced security rule 314 may be applied at any suitable location (or a plurality of locations) across network 106, including but not limited to firewalls, switches, routers, security groups, etc. on network 106, subnets 110A-110N, or network resources 122 to deny or block traffic along the communication path.

While enhanced security rule 314 may be configured to block an entire communication path between resources, implementations described herein are not limited to blocking entire communication paths but may also cover any other manner of reducing data traffic over a connection. Enhanced security rule 314 may also be configured to reduce data traffic over a communication path with additional granularity based on monitored network traffic data. For instance, enhanced security rule 314 may comprise a rule that reduces data traffic for a communication path by blocking or denying communications based on an IP address, a port, or an initiating process relating to the communication, and applying a "deny" action to the rule.

As a non-limiting example, where network traffic data collector 310 determines that a particular one or more of source and/or destination IP addresses communicated over a given path, enhanced security rule 314 may be configured to allow the one or more source and/or destination IP addresses to communicate over the path, but deny all other IP addresses from communicating over the path. In another example, where network traffic data collector 310 determines that a subset of ports or protocols associated with a communication path are utilized during a monitoring period, but other permitted ports or protocols are not being used, enhanced security rule 314 may allow the subset of ports or protocols to communicate (e.g., with "allow" actions applied to their security rule(s)), but block all other ports or protocols from communicating over the path (e.g., with "deny" actions applied to their security rule(s)). In yet another example, enhanced security rule 314 may comprise a security rule that enables communication over a given path initiated by a certain process based on monitored network traffic data, but block communications over the path by other initiating processes. It is also noted and understood that a combination of the above techniques may also be implemented (e.g., allowing and/or blocking a combination of IP addresses, ports, protocols, and/or processes) over a given communication path. For instance, network traffic data collector 310 does not observe any traffic between two resources over a permitted connection, enhanced security rule 314 may comprise a rule (or plurality of rules) that entirely blocks the two resources from communicating. In these ways, network security may be improved based on actual network traffic, while also taking into account existing security rules of network 106.

In yet some other examples, enhanced security rule 314 may comprise a temporal security rule based on a time of day of monitored network traffic. For instance, enhanced security rule 314 may be implemented in a manner that opens a communication path during a particular time period (such as a particular hour, day, week, month, etc.) with a "time" or similar setting coupled with an "allow" action, while restricting the communication path during other time periods. In an illustration, if network traffic data collector 310 determines that a permitted connection is utilized only during a certain time period, rule generator 312 may generate enhanced security rule 314 to be implemented as a temporary rule by deploying the rule to one or more appropriate rule sets during the time period and removing or disabling the rule outside of the time period.

In some example embodiments, enhanced security rule 314 may be recommended 338 to a user (e.g., a security analyst, network administrator, etc.) through an interface, such as implementation GUI 318. Implementation GUI 318 may comprise a suitable graphical user interface through which a user may view enhanced security rule 314 and implement the security rule on network 106. For instance, implementation GUI 318 may be configured to display enhanced security rule 314 as a recommended security rule to enhance the security of network 106 along with reasoning associated with the security rule, such as an indication that the communication path to be restricted by the security was not used (or the use was below a threshold) during the monitoring period, the amount of use that was monitored during the period, one or more graphs, maps, charts, etc. generated by topology map generator 306, network traffic data collector 310, or rule generator 312, etc. Implementation GUI 318 may also provide one or more interactive user controls, such as a selectable icon, button, menu, etc. that upon interaction, enables activation of enhanced security rule 314 on network 106. In some other example embodiments, rule generator 312 may implement enhanced security rule 314 automatically on network 106 by deploying the security rule to the appropriate firewall, router, switch, security group, etc.

Rule generator 312 may generate an enhanced security rule that reduces traffic over a permitted connection in a variety of ways. For example, FIG. 4 shows a flowchart 400 of a method for generating an enhanced security rule based on a determining that network traffic data does not exceed a threshold, according to an example embodiment. In an implementation, the method of flowchart 400 may be implemented by rule generator 312. FIG. 4 is described with continued reference to FIGS. 1 and 3. Other structural and operational implementations will be apparent to persons skilled in the relevant art(s) based on the following discussion regarding flowchart 400 and system 100 and 300 of FIGS. 1 and 3.

Flowchart 400 begins with step 402. In step 402, it is determined that the network traffic data indicates that data traffic over one of the permitted connections does not exceed a threshold of volume or frequency of data traffic. For instance, with reference to FIG. 3, rule generator 312 may be configured to implement one or more data traffic threshold amounts in generating enhanced security rule 314. In implementations, a threshold amount of data traffic may comprise a threshold amount of data traffic based on a volume of data traffic between two of network resources 122, and/or based on a frequency of data traffic between two of network resources 122.

For example, network traffic data collector 310 may monitor data traffic over each permitted connection across network 106 and log and/or store an amount of data traffic in terms of the volume of traffic and/or frequency of communications over each permitted connection during a predefined monitoring period. In one non-limiting illustration, rule generator 312 may comprise a threshold volume of data traffic in terms of bits, bytes, or any other unit of measurement defining data transmission volumes. In another non-limiting illustration, rule generator 312 may comprise a threshold frequency of data traffic as any number (e.g., quantity) of transmissions between pairs of resources over a particular time period (e.g., per hour, day, month, etc.). In example implementations, such thresholds may be predetermined and/or configurable via a suitable user interface, such as implementation GUI 318. Based on the monitored data traffic, rule generator 312 may thereby determine whether the monitored data traffic over a particular connection between resources exceeds a threshold volume of data traffic or a threshold frequency of data traffic in a given time period.

In step 404, the enhanced security rule is generated in response to the determination that the network traffic data indicates that the data traffic does not exceed, in a time period, at least one of a threshold volume of data traffic or a threshold frequency of data traffic. For instance, with continued reference to FIG. 3, rule generator 312 may be configured to generate enhanced security rule 314 based on a determination that the monitored network traffic data does not exceed a threshold amount of volume or frequency of data traffic during a monitoring period. In other words, where the monitored amount of data traffic is below a threshold amount in terms of volume and/or frequency, rule generator 312 may infer that the amount of traffic is not sufficient to keep the permitted connection open or that the data transmission was accidental. In a further example, rule generator 312 may also be configured to implement a combination of thresholds (e.g., both a volume and a frequency threshold). Therefore, in such situations, rule generator 312 may generate enhanced security rule 314 that blocks and/or restricts a communication path for the connection as described herein.

In some other example embodiments, rule generator 312 may implement a strict threshold in generating enhanced security rule 314. For instance, if any traffic (even if minimal) is monitored between resources over a permitted connection, rule generator 312 may determine that such communication was intentional and therefore keep the permitted connection open. In some further examples, rule generator 312 may be configured to generate enhanced security rule 314 as a recommendation to block and/or restrict the communication path along with an indication of the amount of data traffic monitored during the monitoring period. In such examples, the recommended security rule along with threshold information may be displayed via implementation GUI 312 for implementation on network 106.

As described above, an enhanced security rule may be generated with varying levels of granularity in implementations. For example, FIG. 5 shows a flowchart 500 of a method for generating an enhanced security rule that identifies a process that initiated data traffic, according to an example embodiment. In an implementation, the method of flowchart 500 may be implemented by rule generator 312.

FIG. 5 is described with continued reference to FIGS. 1 and 3. Other structural and operational implementations will be apparent to persons skilled in the relevant art(s) based on the following discussion regarding flowchart 500 and systems 100 and 300 of FIGS. 1 and 3.

Flowchart 500 begins with step 502. In step 502, a process that initiates data traffic over a particular connection is identified. For instance, with reference to FIG. 3, network traffic data collector 310 may be configured to store a plurality of parameters associated with monitored network data traffic, including but not limited to the identity of a process that initiates data traffic between pairs of network resources 122. An initiating process includes, but is not limited to, a program, software or process executing on a resource, or other executable process that initiates network data traffic. By monitoring such parameters associated with network data traffic, rule generator 312 may thereby determine an identity of a process that initiates data traffic over a particular one of the permitted connections.

In step 504, an enhanced security rule is generated for the particular connection that allows the identified process to transmit data over the particular connection and denies data transmissions for other processes over the particular connection. For instance, rule generator 312 may generate enhanced security rule 314 that allows data traffic initiated by the identified process (e.g., based on actual data traffic monitored during the monitoring period) and denies data transmissions for other processes. In an illustrative example, if rule generator 312 identifies only a single process that initiates data traffic between pairs of network resources 122 over a particular one of the permitted connections in network 106, rule generator 312 may generate enhanced security rule 314 that enables the identified process to initiate data traffic between the resources, while blocking all other processes (e.g., processes that did not initiate any data traffic over the monitoring period) from initiating data transmissions between the resources. In this manner, enhanced security rule 314 may implement a nano-segmentation technique to limit the processes that initiate transmissions across network 106, thereby further enhancing the security of network 106.

Figure 6:
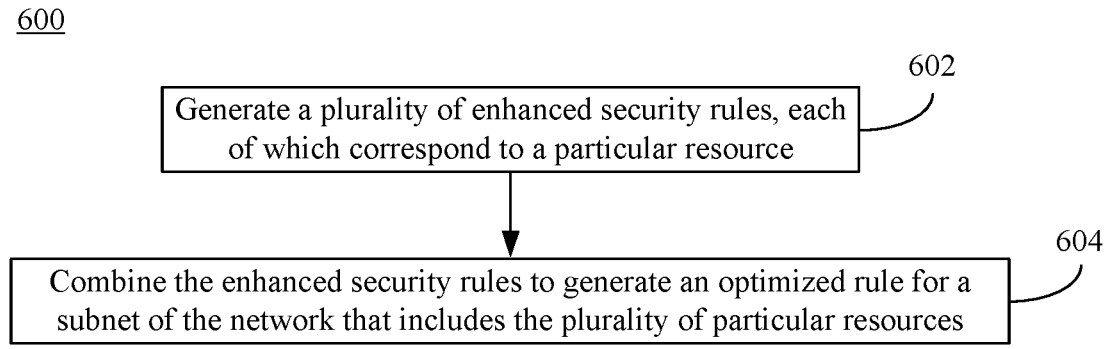
FIG. 6 shows a flowchart of a method for combining a plurality of enhanced security rules, according to an example embodiment.

As described above, rule generator 312 may generate an enhanced security rule for implementation on a network, subnet, and/or an individual resource in implementations. For example, FIG. 6 shows a flowchart 600 of a method for combining a plurality of enhanced security rules, according to an example embodiment. In an implementation, the method of flowchart 600 may be implemented by rule generator 312. FIG. 6 is described with continued reference to FIGS. 1 and 3. Other structural and operational implementations will be apparent to persons skilled in the relevant art(s) based on the following discussion regarding flowchart 600 and systems 100 and 300 of FIGS. 1 and 3.

Flowchart 600 begins with step 602. In step 602, a plurality of enhanced security rules are generated where each security rules corresponds to a particular resource. For instance, with reference to FIG. 3, rule generator 312 may generate a plurality of enhanced security rules 314, where each enhanced security rule corresponds to a particular resource among network resources 122. As illustrated in FIG. 1, for example, the plurality of enhanced security rules 314 may be generated for each of resources 114A-114N (or a subset thereof), or any other grouping of resources among network resources 122. As described herein, the enhanced security rules for the particular network resources may comprise any combination of security rules that allow and/or deny particular communication paths between resources in network 106.

In step 604, the enhanced security rules are combined to generate an optimized rule for a subnet of the network that includes the plurality of particular resources. For instance, with continued reference to FIG. 3, rule generator 312 may be configured to combine the plurality of enhanced security rules 314 to generate an optimized security rule for application on network 106. In implementations, the optimized security rule may be implemented in a particular rule set at the subnet level (e.g., in any one of rule sets 112A-112N) that includes the plurality of resources associated with enhanced security rules 314. In this manner, rule generator 312 may be configured to optimize security rules by including the same restrictions as individual enhanced security rules in a fewer set of broader security rules, thereby reducing the number of security rules to be implemented on network 106.

In an illustrative example, if enhanced security rules 314 for each of resources 114A-114N comprise rules to block certain communication paths (e.g., communications from the same IP, or communications involving the same port, protocol, or initiating process), rule generator 312 may combine such rules into a single rule to be implemented in rule set 112 that blocks/denies the same network activity for all of the resources included within subnet 110A (e.g., a "network security group") rather than implementing separate rules for each of resources 114A-114N. This example is illustrative only, and implementations may cover any other manner of combining rules for various network resources into a fewer number of security rules for application on a higher node or nodes that include the individual resources (e.g., optimized rules may be implemented in one or more of rule set 108 or rule sets 112A-112N). As a result, rule generator 312 may reduce an overall number of security rules by generating a common security rule that may be applied at the appropriate higher hierarchy level while still enhancing network security (e.g., hardening security for each of the resources included within the hierarchy). By reducing the number of rules, a user such as a security analyst may be enabled to more easily and quickly review, analyze, and approve of recommended security rules across 106.

In some other example implementations, rule generator 312 may be configured to combine enhanced security rules 314 to generate an optimized rule in a manner that prioritize rule reduction over complete network hardening. For instance, where a network comprises a relatively large number of resources (e.g., in the hundreds or thousands, or even greater), rule generator 312 may generate many enhanced security rules based on the network topology and monitored network data traffic among the resources. In such instances, rule generator 312 may be configured to prioritize the generation of an optimized rule (or plurality of optimized rules) that reduces the overall number of enhanced security rules by generating rules that may be applied for groups of machines (e.g., at the subnet or network level), even if such rules do not result in complete hardening of network 106.

For example, if subnet 110A comprises 100 resources, and 80 of such resources are determined to communicate with another subnet over a particular communication path (e.g., using a certain port, protocol, or process), but do not communicate with the other subnet using any other communication path, rule generator 312 may generate a single optimized security rule (or set of optimized rules) for implementation on subnet 110A that allows data traffic over the particular communication path for all resources 114A-114N included in subnet 110A, but denies all other communication paths for the resources. Thus, while the optimized rule may leave available certain communication paths that are not used based on monitored network traffic data, an optimized security rule may still enhance the overall security of network 106 while reducing the overall number of security rules.

Figure 7:
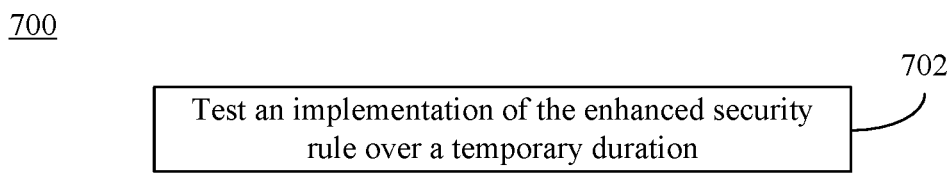
FIG. 7 shows a flowchart of a method for testing an implementation of the enhanced security rule, according to an example embodiment.

In some example implementations, enhanced security rules may be tested on a network prior to restricting a communication path. For example, FIG. 7 shows a flowchart 700 of a method for testing an implementation of the enhanced security rule, according to an example embodiment. In an implementation, the method of flowchart 700 may be implemented by rule tester 316. FIG. 7 is described with continued reference to FIGS. 1 and 3. Other structural and operational implementations will be apparent to persons skilled in the relevant art(s) based on the following discussion regarding flowchart 700 and systems 100 and 300 of FIGS. 1 and 3.

Flowchart 700 begins with step 702. In step 702, an implementation of an enhanced security rule is tested over a temporary duration. For instance, with reference to FIG. 3, rule tester 316 may be configured to obtain 336 enhanced security rule 314 and test an implementation thereof over a temporary duration. In some examples, the temporary duration over which enhanced security rule 314 may be an audit or trial period that is predetermined or configurable via implementation GUI 318 during which rule tester 316 tracks a potential implementation of enhanced security rule 314 for communications on network 106. Rule tester 316 may store and/or log each instance of network traffic that would be allowed and/or denied if enhanced security rule 314 was fully implemented, and provide such information to implementation GUI 318 for review by an analyst. Based on the tested implementation of enhanced security rule 314 over the trial or audit period, the security analyst may determine to fully implement the rule on network 106, discard the rule, or continue testing the rule for an additional duration through an interaction with one or more user controls of implementation GUI 318.

Accordingly, embodiments improve network security in an automatic fashion that is not possible in conventional implementations. Embodiments automatically analyze network configurations to determine allowed communications, determine the associated security rules, and collect assessments of network data traffic (e.g., data traffic in the form of data packets, communications according to network protocols, etc.), and use this information to generate security rules that deny communications over allowed connections that are underutilized, or not used at all. In this manner, intruders (e.g., malicious software such as computer viruses, worms, Trojan horses, ransomware, spyware, adware, and scareware, hackers that have infiltrated the network via misappropriated passwords, security vulnerabilities, and allowed personnel that engage in improper network activity) may be denied and/or restricted in their ability to navigate a network to cause harm. Embodiments described herein enable network security not previously practical due to the complexity of networks, including the numbers of network resources and vast numbers of connections between them. Embodiments enable savings in computer resources, such as processor utilization and memory usage, by the efficient detection of underutilized connections and configuration of appropriate security rules thereon.

III. Example Mobile and Stationary Device Embodiments

Security manager 102, rule generation system 104, network 106, subnets 110A-110N, resources 114A-114N, resources 118A-118N, and network monitor agents 322 (and/or any subcomponents of any of the same), flowchart 200, flowchart 400, flowchart 500, flowchart 600, and/or flowchart 700 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of security manager 102, rule generation system 104, network 106, subnets 110A-110N, resources 114A-114N, resources 118A-118N, and network monitor agents 322 (and/or any subcomponents thereof), flowchart 200, flowchart 400, flowchart 500, flowchart 600, and/or flowchart 700 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
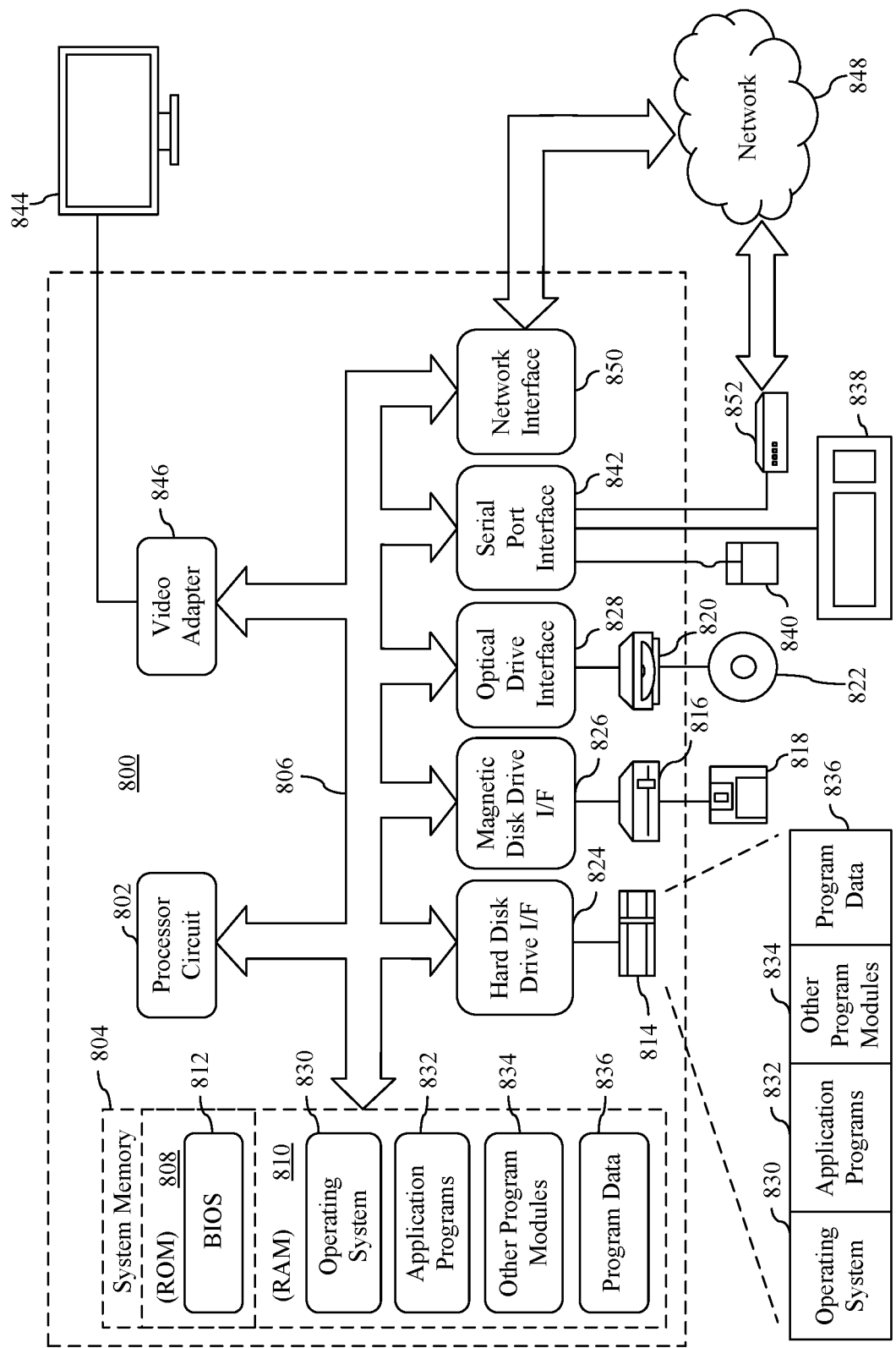
FIG. 8 shows a block diagram of an example computing device that may be used to implement example embodiments.

FIG. 8 depicts an exemplary implementation of a computing device 800 in which example embodiments may be implemented. For example, any of security manager 102, rule generation system 104, network 106, subnets 110A-110N, resources 114A-114N, resources 118A-118N, or network monitor agents 322 (or any subcomponents thereof) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Example embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing security manager 102, rule generation system 104, network 106, subnets 110A-110N, resources 114A-114N, resources 118A-118N, and network monitor agents 322 (and/or any subcomponents thereof), flowchart 200, flowchart 400, flowchart 500, flowchart 600, and/or flowchart 700 (including any suitable step of flowcharts 200, 400, 500, 600, or 700) and/or further example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic. RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for generating a network security rule is disclosed herein. The system includes: one or more processors; and one or more memory devices that store program code configured to be executed by the one or more processors, the program code comprising: an allowed connections determiner that includes: a security rule determiner configured to determine security rules across a network that includes a plurality of resources, and a topology map generator configured to generate a map of permitted connections between resources over the network: a network traffic data collector configured to gather network traffic data that corresponds to data traffic between the resources over the permitted connections; and a rule generator configured to generate an enhanced security rule for a permitted connection indicated in the map based on the security rules and the network traffic data, the enhanced security rule configured to reduce data traffic over the permitted connection.

In one implementation of the foregoing system, the rule generator is further configured to: determine that the network traffic data indicates data traffic over the permitted connection does not exceed, in a time period, at least one of a threshold volume of data traffic or a threshold frequency of data traffic; and generate the enhanced security rule in response to the determination that the network traffic data indicates data traffic does not exceed, in a time period, at least one of a threshold volume of data traffic or a threshold frequency of data traffic.

In another implementation of the foregoing system, the rule generator is further configured to: identify a process that initiates data traffic over a particular connection; and generate an enhanced security rule for the particular connection that allows the identified process to transmit data over the particular connection and denies data transmissions for other processes over the particular connection.

In another implementation of the foregoing system, the rule generator is configured to: generate a plurality of enhanced security rules, each of which corresponds to a particular resource of a plurality of particular resources; and combine the enhanced security rules to generate an optimized rule for a subnet of the network that includes the plurality of particular resources.

In another implementation of the foregoing system, the network traffic data collector is configured to deploy a plurality of network monitor agents to monitor data traffic over the permitted connections.

In another implementation of the foregoing system, the system further includes a rule tester configured to test an implementation of the enhanced security rule over a temporary duration.

In another implementation of the foregoing system, the system further includes: a GUI configured to: display the enhanced security rule; and enable activation of the security rule via interaction with a GUI element.

A method in a computing device for generating a network security rule is disclosed herein. The method includes determining security rules across a network that includes a plurality of resources; generating a map of permitted connections between resources over the network; gathering network traffic data that corresponds to data traffic between the resources over the permitted connections; and generating an enhanced security rule for a permitted connection indicated in the map based on the security rules and the network traffic data, the enhanced security rule configured to reduce data traffic over the permitted connection.

In one implementation of the foregoing method, the generating the enhanced security rule comprises: determining that the network traffic data indicates data traffic over the permitted connection does not exceed, in a time period, at least one of a threshold volume of data traffic or a threshold frequency of data traffic; and generating the enhanced security rule in response to the determination that the network traffic data indicates data traffic does not exceed, in a time period, at least one of a threshold volume of data traffic or a threshold frequency of data traffic.

In another implementation of the foregoing method, the method further includes: identifying a process that initiates data traffic over a particular connection; and generating an enhanced security rule for the particular connection that allows the identified process to transmit data over the particular connection and denies data transmissions for other processes over the particular connection.

In another implementation of the foregoing method, the generating the enhanced security rule comprises: generating a plurality of enhanced security rules, each of which corresponds to a particular resource of a plurality of particular resources; and combining the enhanced security rules to generate an optimized rule for a subnet of the network that includes the plurality of particular resources.

In another implementation of the foregoing method, the gathering the network traffic data comprises: deploying a plurality of network monitor agents to monitor data traffic over the permitted connections.

In another implementation of the foregoing method, the method further includes: testing an implementation of the enhanced security rule over a temporary duration.

In another implementation of the foregoing method, the method further includes: providing the enhanced security rule for displaying in a GUI; and providing an GUI element that when activated, enables activation of the security rule.

A computer-readable memory is disclosed herein. The computer-readable memory has computer program code recorded thereon that when executed by at least one processor causes the at least one processor to perform a method comprising: determining security rules across a network that includes a plurality of resources; generating a map of permitted connections between resources over the network; gathering network traffic data that corresponds to data traffic between the resources over the permitted connections; and generating an enhanced security rule for a permitted connection indicated in the map based on the security rules and the network traffic data, the enhanced security rule configured to reduce data traffic over the permitted connection.

In one implementation of the foregoing computer-readable memory, the generating the enhanced security rule comprises: determining that the network traffic data indicates data traffic over the permitted connection does not exceed, in a time period, at least one of a threshold volume of data traffic or a threshold frequency of data traffic; and generating the enhanced security rule in response to the determination that the network traffic data indicates data traffic does not exceed, in a time period, at least one of a threshold volume of data traffic or a threshold frequency of data traffic.

In another implementation of the foregoing computer-readable memory, the method further includes: identifying a process that initiates data traffic over a particular connection; and generating an enhanced security rule for the particular connection that allows the identified process to transmit data over the particular connection and denies data transmissions for other processes over the particular connection.

In another implementation of the foregoing computer-readable memory, the generating the enhanced security rule comprises: generating a plurality of enhanced security rules, each of which corresponds to a particular resource of a plurality of particular resources; and combining the enhanced security rules to generate an optimized rule for a subnet of the network that includes the plurality of particular resources.

In another implementation of the foregoing computer-readable memory, the gathering the network traffic data comprises: deploying a plurality of network monitor agents to monitor data traffic over the permitted connections.

In another implementation of the foregoing computer-readable memory, the method further includes: testing an implementation of the enhanced security rule over a temporary duration.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for generating a network security rule, the system comprising:
one or more processors; and
one or more memory devices that store program code configured to be executed by the one or more processors, the program code comprising:
an allowed connections determiner that includes:
a security rule determiner configured to determine security rules across a network that includes a plurality of resources, and
a topology map generator configured to generate a map of permitted connections between resources over the network;
a network traffic data collector configured to gather network traffic data that corresponds to data traffic between the resources over the permitted connections, the network data indicating a permitted connection that is used for data traffic less than others of the permitted connections; and
a rule generator configured to generate an enhanced security rule for the permitted connection indicated in the map based on the security rules and the network traffic data, the enhanced security rule configured to reduce data traffic over the permitted connection.

2. The system of claim 1, wherein the rule generator is further configured to:
determine that the network traffic data indicates data traffic over the permitted connection does not exceed, in a time period, at least one of a threshold volume of data traffic or a threshold frequency of data traffic; and
generate the enhanced security rule in response to the determination that the network traffic data indicates data traffic does not exceed, in a time period, at least one of a threshold volume of data traffic or a threshold frequency of data traffic.

3. The system of claim 1, wherein the rule generator is further configured to:
identify a process that initiates data traffic over a particular connection; and
generate an enhanced security rule for the particular connection that allows the identified process to transmit data over the particular connection and denies data transmissions for other processes over the particular connection.

4. The system of claim 1, wherein the rule generator is configured to:
generate a plurality of enhanced security rules, each of which corresponds to a particular resource of a plurality of particular resources; and
combine the enhanced security rules to generate an optimized rule for a subnet of the network that includes the plurality of particular resources.

5. The system of claim 1, wherein the network traffic data collector is configured to deploy a plurality of network monitor agents to monitor data traffic over the permitted connections.

6. The system of claim 1, further comprising:
a rule tester configured to test an implementation of the enhanced security rule over a temporary duration.

7. The system of claim 1, further comprising:
a graphical user interface (GUI) configured to:
display the enhanced security rule; and
enable activation of the security rule via interaction with a GUI element.

8. A method in a computing device for generating a network security rule, the method comprising:
determining security rules across a network that includes a plurality of resources;
generating a map of permitted connections between resources over the network;
gathering network traffic data that corresponds to data traffic between the resources over the permitted connections, the network data indicating a permitted connection that is used for data traffic less than others of the permitted connections; and
generating an enhanced security rule for the permitted connection indicated in the map based on the security rules and the network traffic data, the enhanced security rule configured to reduce data traffic over the permitted connection.

9. A method in a computing device for generating a network security rule, the method comprising:
determining security rules across a network that includes a plurality of resources;
generating a map of permitted connections between resources over the network;
gathering network traffic data that corresponds to data traffic between the resources over the permitted connections; and
generating an enhanced security rule for a permitted connection indicated in the map based on the security rules and the network traffic data, the enhanced security rule configured to reduce data traffic over the permitted connection, wherein said generating the enhanced security rule comprises:
determining that the network traffic data indicates data traffic over the permitted connection does not exceed, in a time period, at least one of a threshold volume of data traffic or a threshold frequency of data traffic; and
generating the enhanced security rule in response to the determination that the network traffic data indicates data traffic does not exceed, in a time period, at least one of a threshold volume of data traffic or a threshold frequency of data traffic.

10. The method of claim 8, further comprising:
identifying a process that initiates data traffic over a particular connection; and
generating an enhanced security rule for the particular connection that allows the identified process to transmit data over the particular connection and denies data transmissions for other processes over the particular connection.

11. The method of claim 8, wherein said generating the enhanced security rule comprises:
generating a plurality of enhanced security rules, each of which corresponds to a particular resource of a plurality of particular resources; and
combining the enhanced security rules to generate an optimized rule for a subnet of the network that includes the plurality of particular resources.

12. The method of claim 8, wherein said gathering the network traffic data comprises:
deploying a plurality of network monitor agents to monitor data traffic over the permitted connections.

13. The method of claim 8, further comprising:
testing an implementation of the enhanced security rule over a temporary duration.

14. The method of claim 8, further comprising:
providing the enhanced security rule for displaying in a graphical user interface (GUI); and providing an GUI element that when activated, enables activation of the security rule.

15. A computer-readable memory having computer program code recorded thereon that when executed by at least one processor causes the at least one processor to perform a method comprising:
    determining security rules across a network that includes a plurality of resources;
    generating a map of permitted connections between resources over the network;
    gathering network traffic data that corresponds to data traffic between the resources over the permitted connections, the network data indicating a permitted connection that is used for data traffic less than others of the permitted connections; and
    generating an enhanced security rule for the permitted connection indicated in the map based on the security rules and the network traffic data, the enhanced security rule configured to reduce data traffic over the permitted connection.

16. The computer-readable memory of claim 15, wherein said generating the enhanced security rule comprises:
    determining that the network traffic data indicates data traffic over the permitted connection does not exceed, in a time period, at least one of a threshold volume of data traffic or a threshold frequency of data traffic; and
    generating the enhanced security rule in response to the determination that the network traffic data indicates data traffic does not exceed, in a time period, at least one of a threshold volume of data traffic or a threshold frequency of data traffic.

17. The computer-readable memory of claim 15, further comprising:
    identifying a process that initiates data traffic over a particular connection; and
    generating an enhanced security rule for the particular connection that allows the identified process to transmit data over the particular connection and denies data transmissions for other processes over the particular connection.

18. The computer-readable memory of claim 15, wherein said generating the enhanced security rule comprises:
    generating a plurality of enhanced security rules, each of which corresponds to a particular resource of a plurality of particular resources; and
    combining the enhanced security rules to generate an optimized rule for a subnet of the network that includes the plurality of particular resources.

19. The computer-readable memory of claim 15, wherein said gathering the network traffic data comprises:
    deploying a plurality of network monitor agents to monitor data traffic over the permitted connections.

20. The computer-readable memory of claim 15, further comprising:
    testing an implementation of the enhanced security rule over a temporary duration.

* * * * *